United States Patent
Langlois et al.

[19]

[11] Patent Number: 6,125,713
[45] Date of Patent: Oct. 3, 2000

[54] METHOD AND APPARATUS FOR REPAIRING A CRANKSHAFT

[75] Inventors: John M. Langlois, Baton Rouge; Shannon D. Gandy, LaCombe, both of La.

[73] Assignee: Partco, Inc., Baton Rouge, La.

[21] Appl. No.: 09/204,901

[22] Filed: Dec. 3, 1998

[51] Int. Cl.$^7$ ............................... F16H 55/12; B23P 6/00
[52] U.S. Cl. ....................... 74/450; 29/402.01; 29/402.08
[58] Field of Search ........................... 29/402.01, 402.08; 74/450

[56] References Cited

U.S. PATENT DOCUMENTS

| | | | |
|---|---|---|---|
| 3,742,779 | 7/1973 | Shaver | 74/448 |
| 4,031,769 | 6/1977 | Kassing | 74/448 X |
| 4,412,443 | 11/1983 | Stoehr | 74/450 X |
| 4,609,312 | 9/1986 | Sverdlin | 409/137 |
| 5,042,319 | 8/1991 | Hobock et al. | 74/570 |
| 5,539,979 | 7/1996 | Powers . | |

FOREIGN PATENT DOCUMENTS

| | | | |
|---|---|---|---|
| 612214 | 1/1961 | Canada | 74/450 |
| 839702 | 6/1960 | United Kingdom | 74/450 |

Primary Examiner—Allan D. Herrmann
Attorney, Agent, or Firm—Garvey, Smith, Nehrbass & Doody, LLC

[57] ABSTRACT

The present invention provides and improved method of repairing a crankshaft body having a removable gear. The apparatus includes a crankshaft body having first and second end portions, one end portion carrying a raised annular rib that defines and enlarged diameter portion of the body, the body having a center of rotation during use. A ring gear is removably mounted at one of the end portions upon the annular rib. The ring gear is comprised of a pair of gear sections, each having a generally semicircular recess that is shaped to conform to the outer surface of the crankshaft body at the rib, a pair of opposed mating faces, and a generally semicircular outer toothed surface. A removable connection secures each gear section to the crankshaft body. The removable connection includes a plurality of openings in the crankshaft at the raised annular rib. The openings extend circumferentially about the crankshaft center of rotation. A plurality of fasteners attach each gear section to the crankshaft at the openings in the annular rib. Further, fasteners are provided for affixing the gear sections together at the mating faces. A keyway prevents relative rotation between the ring gear and the crankshaft body.

39 Claims, 11 Drawing Sheets

METHOD AND APPARATUS FOR REPAIRING A CRANKSHAFT

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to repair of crankshafts of internal combustion engines. More particularly, the present invention relates to the repair of the crankshaft ring gear of an internal combustion engine wherein a removable gear comprised of two gear half sections is attached to the crankshaft with a plurality of fasteners that extend circumferentially about the ring gear at an annular flange and which hold the ring gear at the annular flange to a raised annular rib portion of the crankshaft.

2. General Background of the Invention

The repair of crankshafts for small internal combustion engines such as the engines of lawn mowers, tractors, automobiles and the like is relatively straight forward. There are however, very large internal combustion engines such as the compressor engines that are used in the offshore oil and gas industry to transmit natural gas from an offshore or like remote location to pipelines and then in shore. These compressors can be very large, some as large as a house. For example, Cooper Bessemer compressors use engines that range between about 750 and 4000 horse power. Repair of these engines presents special problems.

Some patents have issued that relate to the repair of crankshafts. One example is U.S. Pat. No. 5,539,979 issued to Powers and entitled "Method and Apparatus for Repairing the Rear Seal Area on the Crankshaft of an Internal Combustion Engine".

A split bearing eccentric drive is disclosed in U.S. Pat. No. 5,042,319.

The Sverdlin Patent 4,609,312 discloses an apparatus for an in-situ crankshaft reconditioning that includes a bracket connectable to the crankshaft webs in a variety of sizes and configurations.

One of the problems of repairing very large crankshafts in a remote environment (such as the oil and gas well drilling platforms in the Gulf of Mexico) is that of repairing the crankshaft when the ring gear must be replaced. In such a hostile and remote environment, the expense of completely disassembling the engine and removing the entire crankshaft can be expensive.

BRIEF SUMMARY OF THE INVENTION

The present invention provides an improved method of repairing a crankshaft body having first and second end portions, a center of rotation, and a ring gear at one end portion thereof. The method includes the step of removing the worn gear from the crankshaft end portion and providing a replacement ring gear. The replacement ring gear comprises a pair of gear half sections, each gear half section having a curved surface that conforms generally to the outer surface of the crankshaft and a pair of opposed flat mating surfaces that engage face to face upon assembly of the gear half sections.

A transversely extending annular flange extends radially inwardly from the two gear half sections along a plane that intersects the center of rotation of the crankshaft. This inwardly extending annular surface provides an attachment for each of the ring gear sections to the crankshaft upon assembly.

A plurality of openings are formed in the crankshaft, the openings extending circumferentially about the center of rotation of the crankshaft.

Each gear half section is fastened to the crankshaft with fasteners such as bolts that attach the gear half section to the crank shaft at the openings. Each gear half section is fastened to the other at the mating faces with bolted connections for example.

The openings formed in the crankshaft are preferably internally threaded openings that extend circumferentially about the crankshaft center of rotation. The fastening of each gear half section to the crankshaft is preferably with bolted connections that attach each gear half section to the crankshaft of the internally threaded openings, the fasteners and openings both being generally parallel to the center of rotation of the crankshaft. Fastening of each gear half section to the crankshaft is accomplished so that the mating faces of one gear half section engage in contact the mating surfaces of the other gear half section. The gear half sections are attached to the crankshaft with fasteners that attach the gear half sections to the crankshaft at the openings. Additional fasteners attach each gear half section to the other.

The present invention provides an improved crankshaft apparatus that includes a crankshaft body with an elongated member having first and second end portions, the body having a center of rotation during use, and an annular rib at one end portion of the crankshaft body that extends outwardly therefrom to define a maximum diameter of the crankshaft.

A ring gear is removably mounted at one of the end portions of the crankshaft body. The ring gear comprises a pair of gear half sections, each gear half section having a generally semicircular curved inner surface defining a recess that is shaped and sized to conform to the outer surface of the crankshaft body next to the annular rib.

Each ring gear half section includes generally flat opposed mating faces and a generally semicircular toothed section.

Each ring gear section also includes an annular flange that extends radially inwardly of said semicircular curved inner surfaces of the respective gear half sections.

A removable connection secures each ring gear section to the crankshaft body. The removable section preferably includes a plurality of openings in the crankshaft, the plurality of openings preferably being internally threaded, and extending circumferentially about the crankshaft center of rotation. A plurality of fasteners, preferably of bolts attach each gear section to the crankshaft at the openings.

The removable connection also includes fasteners that fasten each of the gear sections together at a position next to the mating faces. The removable connection between the gear sections is a connection that is independent of the connection of each gear half section to the crankshaft body.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figures 1, 5:
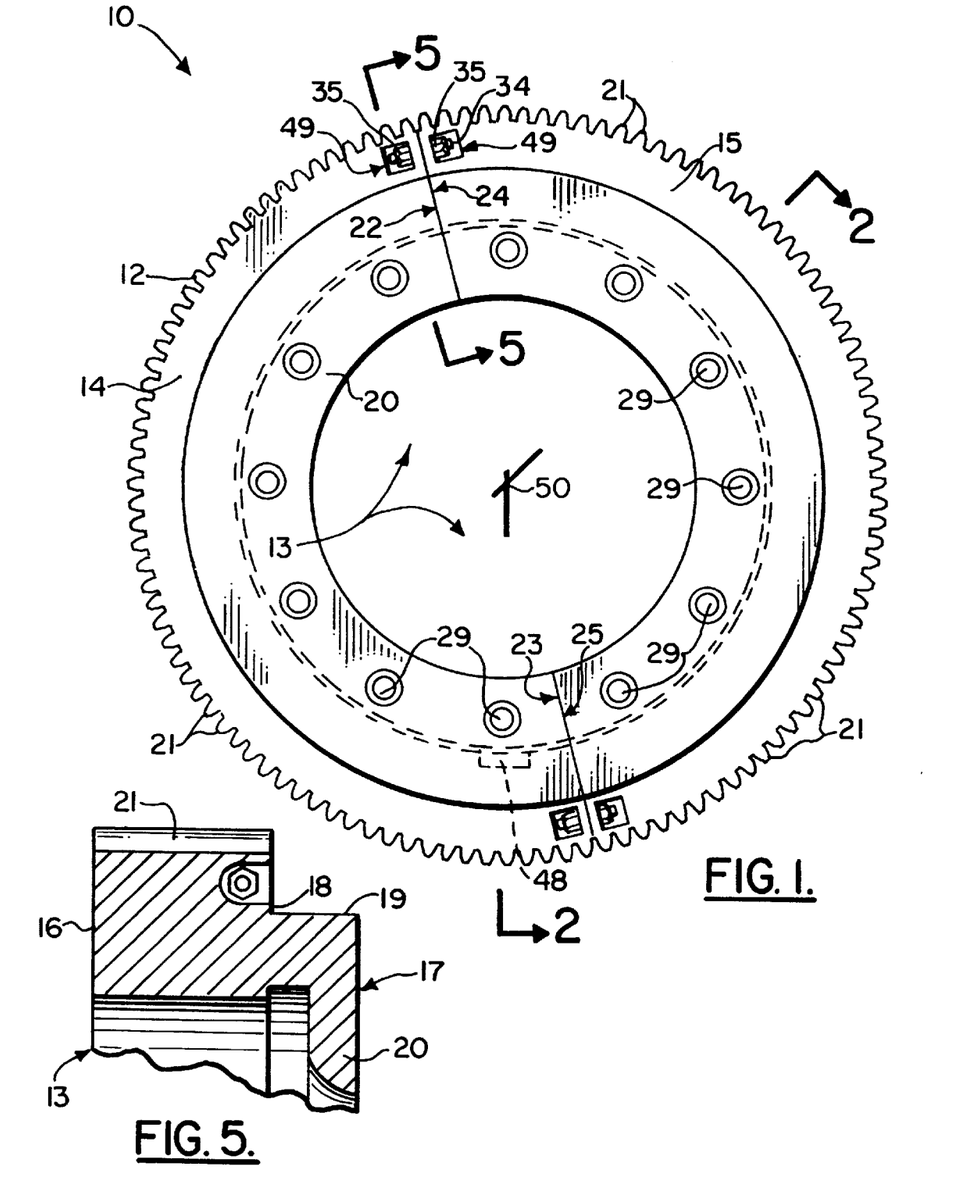
FIG. 1 is an end view of the preferred embodiment of the apparatus of the present invention.
FIG. 5 is a sectional view taken along lines 5—5 of FIG. 1.
Figure 2:
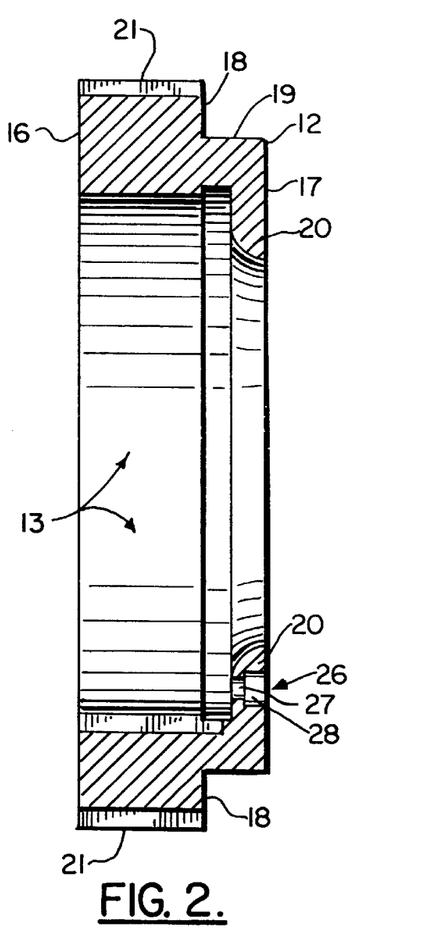
FIG. 2 is a sectional view taken along lines 2—2 of FIG. 1.
Figures 3, 4:
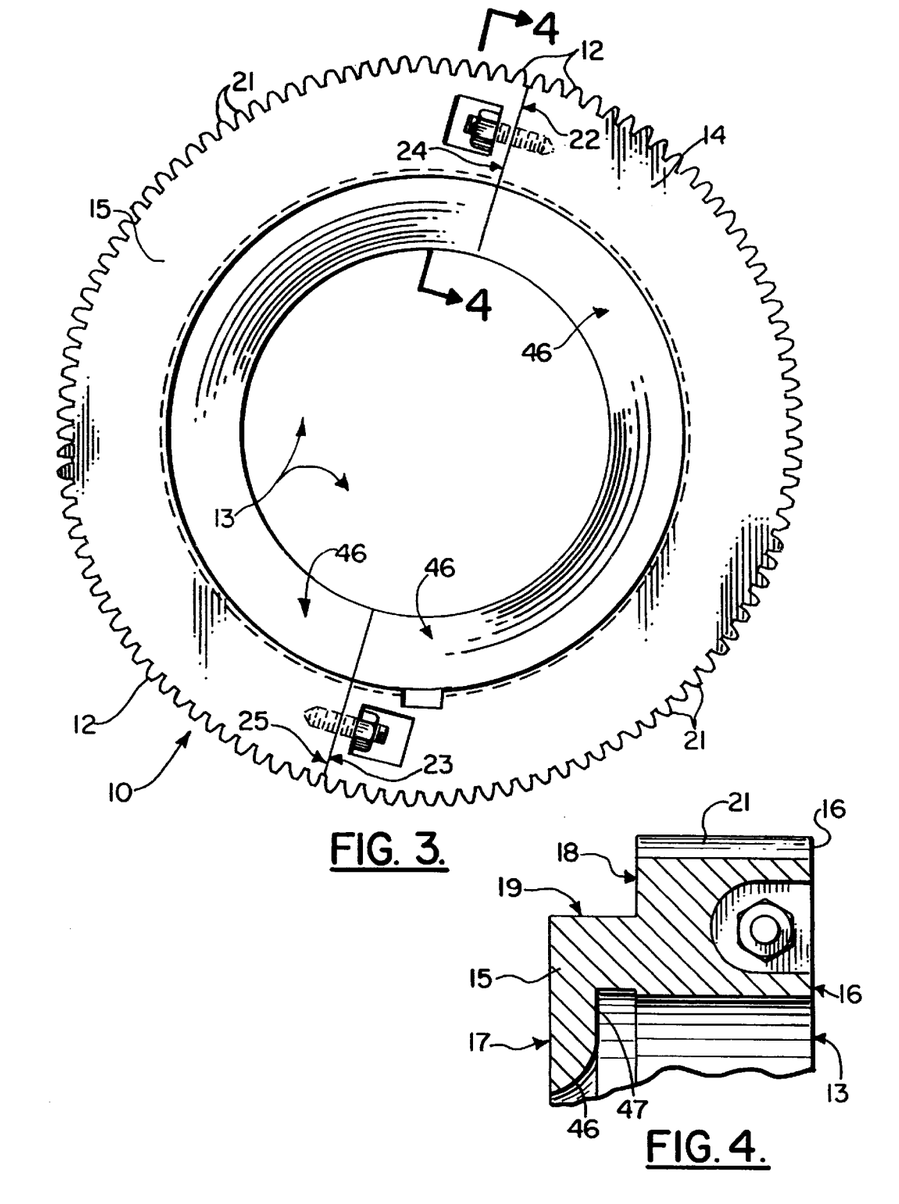
FIG. 3 is a partial end view of the preferred embodiment of the apparatus of the present invention.
FIG. 4 is a sectional view taken along lines 4—4 of FIG. 3.
Figure 8:
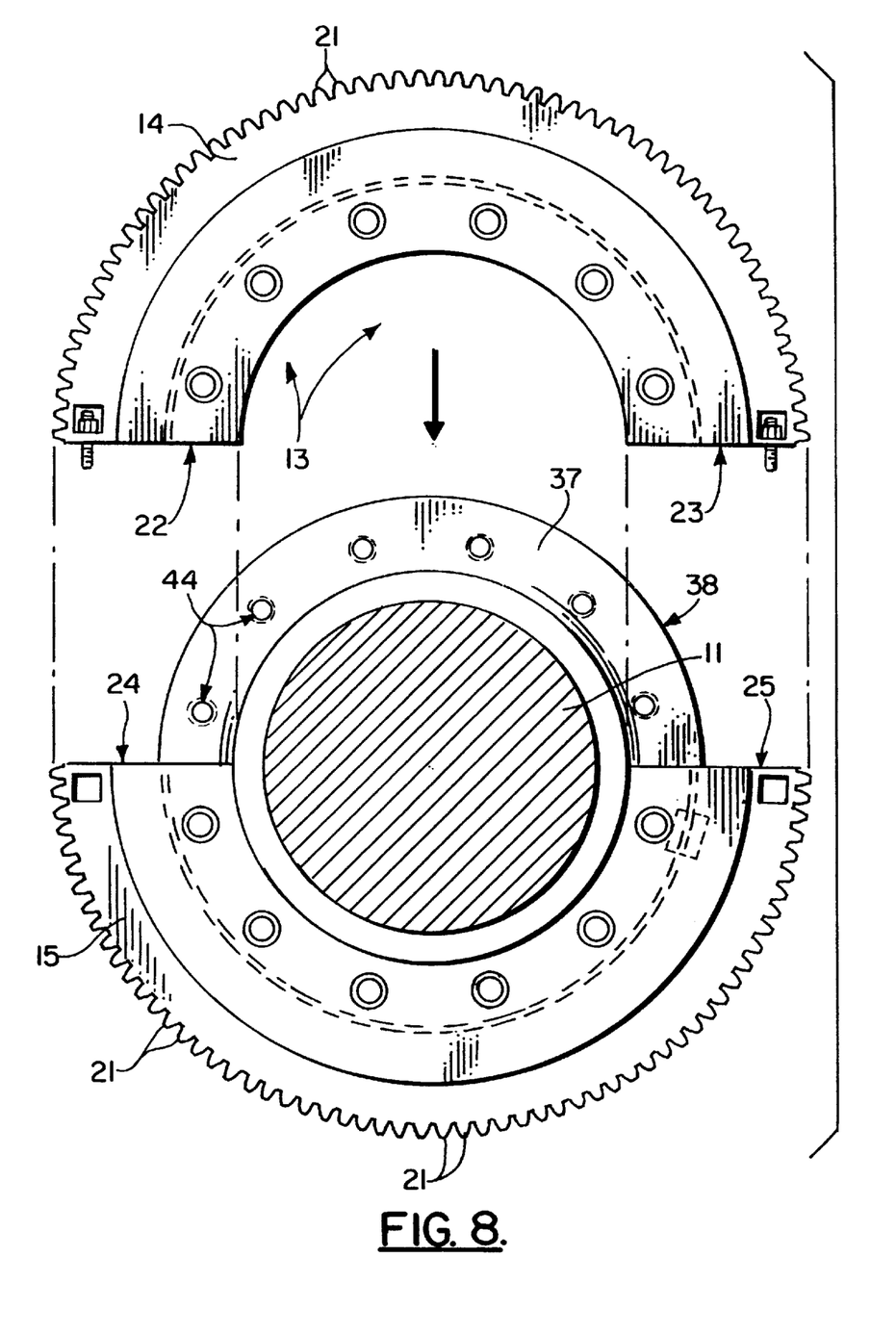
FIG. 8 is an exploded view of the preferred embodiment of the apparatus of the present invention.
Figure 9:
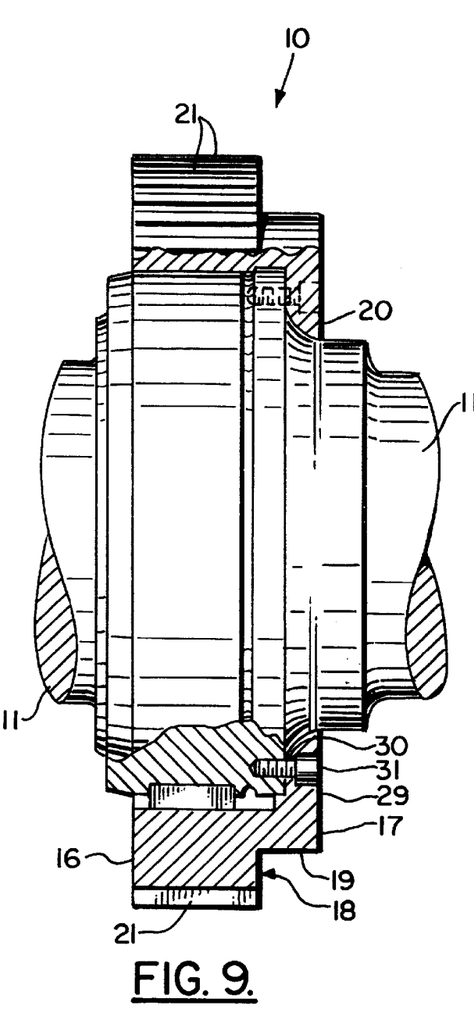
FIG. 9 is a sectional elevational view of the preferred embodiment of the apparatus of the present invention.
Figure 10:
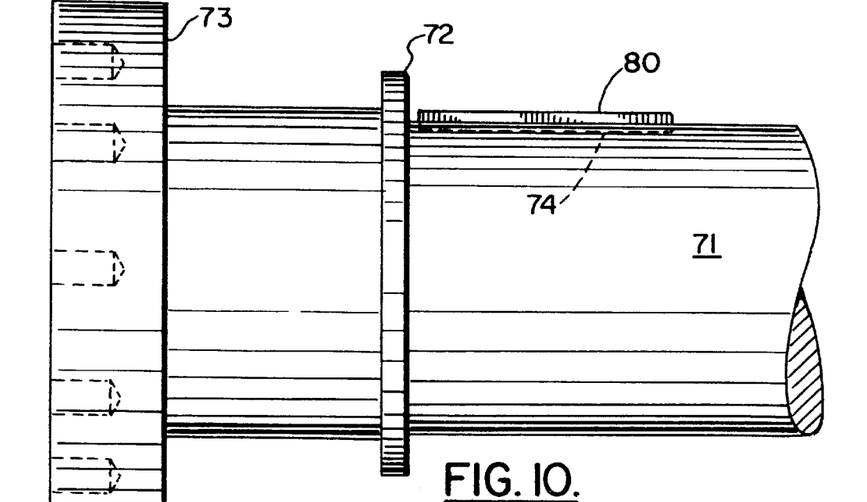
FIG. 10 is a side fragmentary view of an alternate embodiment of the apparatus of the present invention.

FIGS. 1–9 show the preferred embodiment of the apparatus of the present invention designated generally by the numeral 10 in FIGS. 1, 3 and 9. Crankshaft gear repair apparatus 10 includes a gear member 12 that can be removably mounted to a crankshaft body 11. The gear member 12 is shown in FIG. 1 including a pair of gear halves 14, 15 that surround a central circular opening 13 through which the crankshaft body 11 passes upon assembly (see FIGS. 1, 8 and 9).

Each gear half 14, 15 has an annular flat face 16 that defines a plane. Similarly, an opposed flat surface 17 is an annular surface that is generally parallel to the surface 16. A third flat annular face 18 is positioned in between the surfaces 16, 17 as shown in FIGS. 2, 4 and 9. Annular surface 19 is a smooth cylindrical surface that has a central longitudinal axis that is coincident with the axis of rotation 50 of crankshaft body 11. Annular surface 19 communicates with flat annular surface 18 and flat annular surface 17 defining right angles with each of those surfaces 17, 18 in the transverse section of FIG. 2. Each gear half section 14, 15 has part of an annular shoulder 20. Upon assembly (see FIG. 1), the annular shoulder 20 is a continuous shoulder, extending 360 degrees. Shoulder 21 fits closely to surfaces 41, 42 of annular hub 37. Shoulder 20 has an edge 45 that defines the smallest diameter of opening 13. Shoulder 20 is flat on one side at surface 17, and curved on its opposing side at surface 46. The shoulder also includes flat annular surface 47. During use, surface 46 fits closely to surface 42 of annular hub 37. Surface 47 fits closely to surface 41 of annular hub 37.

Gear 12 provides an outer generally cylindrically shaped surface covered with a plurality of gear teeth 21. The plurality of gear teeth 21 as shown in FIG. 1 define a diameter that is larger than the diameter of annular cylindrical surface 19.

In FIGS. 1 and 8, each of the gear halves 14, 15 provides a plurality of flat mating surfaces. The gear half 14 includes a pair of flat mating surfaces 22, 23 that define a plane. The gear half 15 provides a pair of flat mating surfaces 24, 25 that also define a plane. Upon assembly using stud 34 and assembly nuts 35, the flat mating surfaces 22, 23 respectively engage and abut the flat mating surfaces 24, 25. Keyway 36 fits keyway slot 48 to prevent relative rotation between crankshaft 11 and gear sections 14, 15.

In FIG. 2, there can be seen an opening 26 that is sized and shaped to receive a bolt 29 therethrough. The opening 26 includes a smaller diameter section 27 and a larger diameter section 28. In FIG. 9, bolt 29 is occupying an opening 26. In FIG. 9, the bolt 29 includes an elongated externally threaded shank 30 and an enlarged diameter bolt head 31. A plurality of bolts 29 are provided, spaced circumferentially about each gear half 14, 15. Openings 26 are preferably being an equiradial space from the center of rotation 50 of crankshaft body 11.

Figure 6:
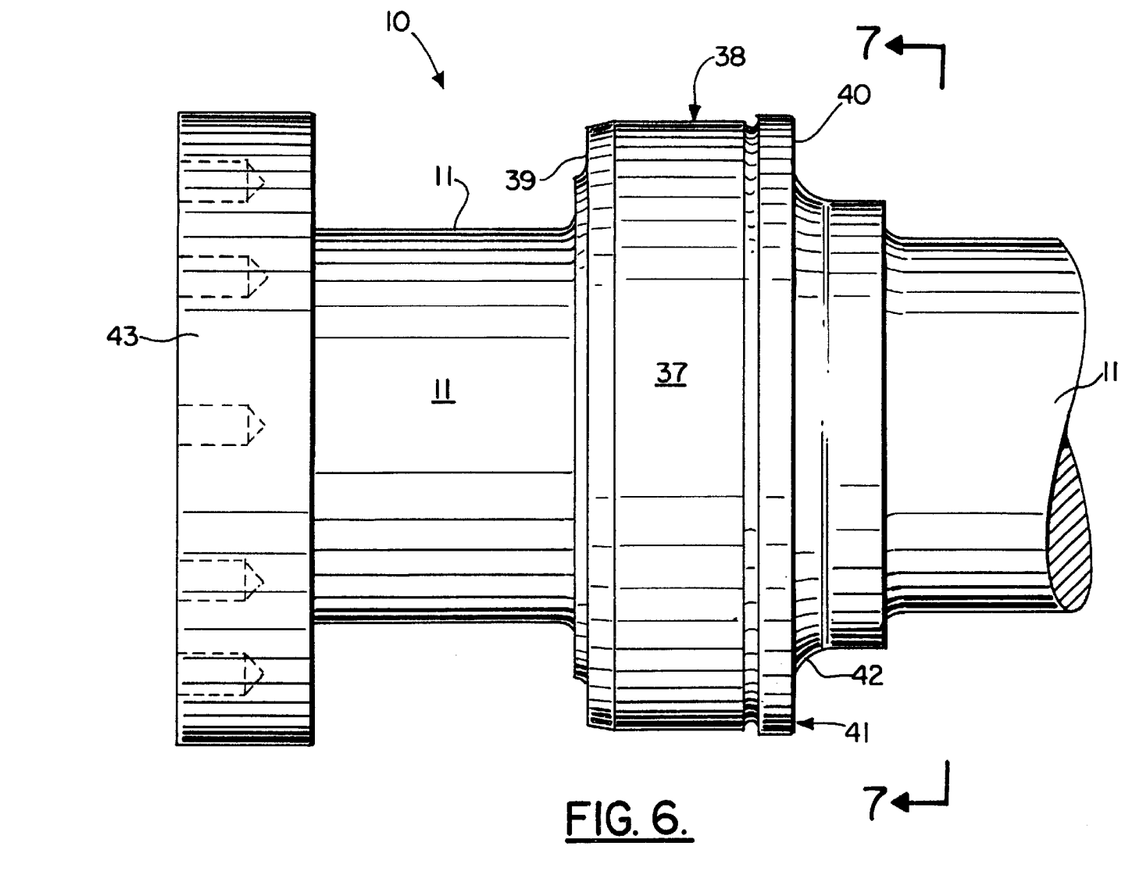
FIG. 6 is a partial frontal view of the preferred embodiment of the present invention showing the crankshaft and hub before installation of the gear half sections thereon.
Figure 7:
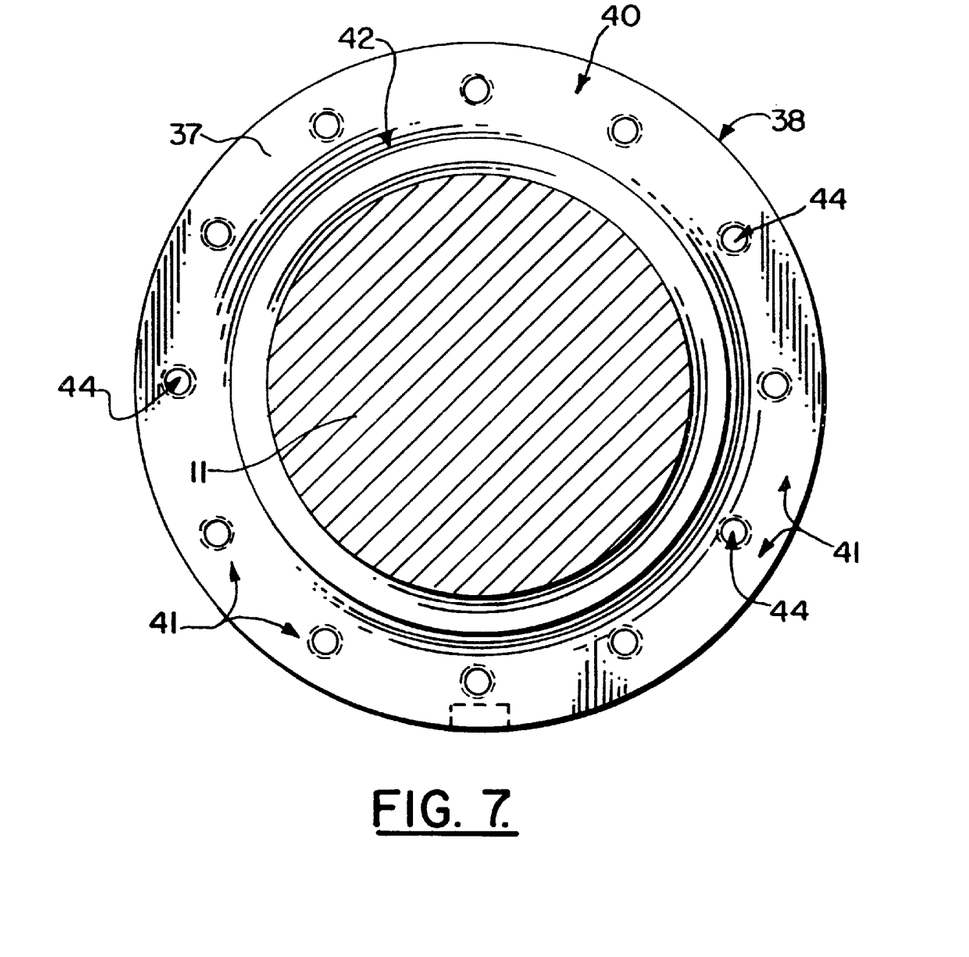
FIG. 7 is a sectional view taken along lines 7—7 of FIG. 6.

Crankshaft body 11 provides enlarged diameter annular hub 37 as shown in FIGS. 6 and 9. Hub 37 is comprised of an enlarged diameter cylindrically shaped portion 38 and a pair of opposed transversely extending surfaces 39, 40. Surface 39 is generally flat. The surface 40 includes both flat 41 and curved 42 sections. In FIG. 6, crankshaft body 11 also includes flywheel 43.

Annular hub 37 has a plurality of internally threaded openings 44 at the flat annular surface 41 of surface 40. Each of the internally threaded openings 44 receives a threaded bolt shank 30 portion of bolt 29 when a gear half 14 or 15 is bolted to annular surface 40 of annular hub 37 as shown in FIGS. 1 and 8–9. Each gear half 14, 15 is thus bolted to crankshaft 12 to annular hub 37. Each gear half 14, 15 is also connected to the other gear half.

Figure 11:
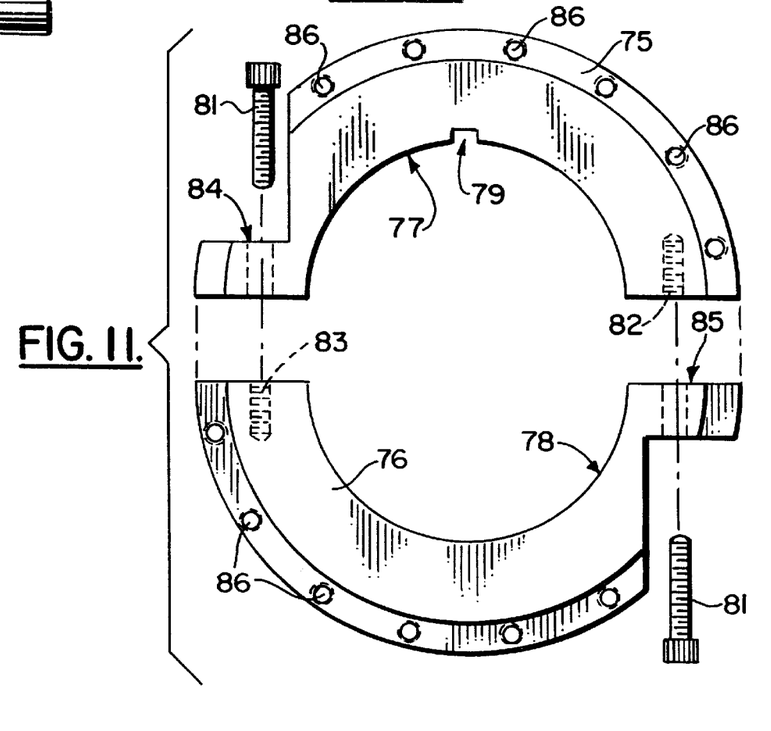
FIG. 11 is an exploded partial elevational view of the alternate embodiment of the apparatus of the present invention.
Figure 12:
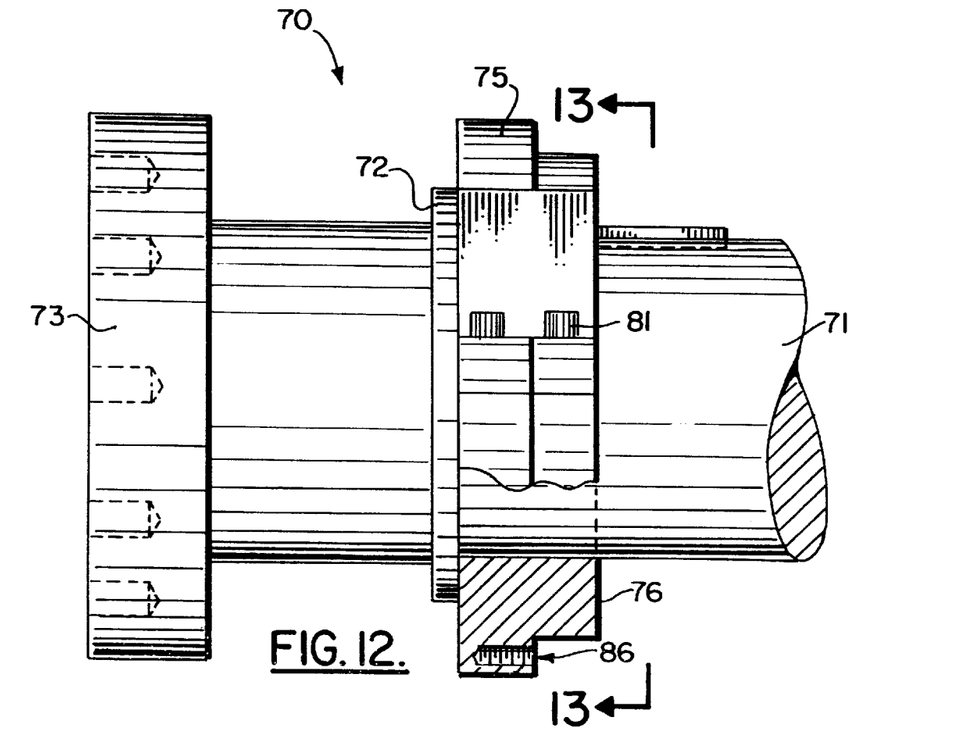
FIG. 12 is a side elevational view of the alternative embodiment of the apparatus of the present invention.
Figure 13:
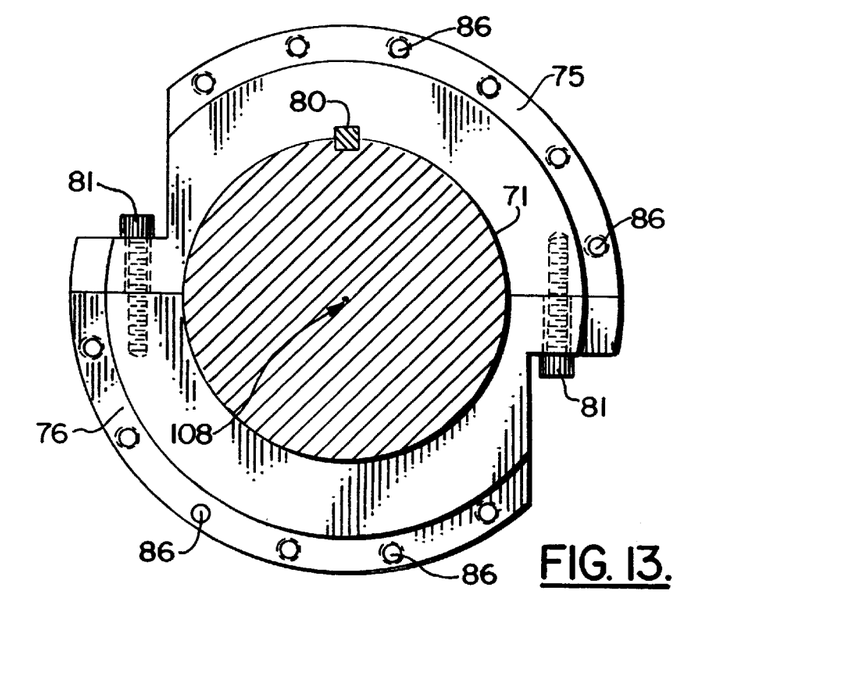
FIG. 13 is a sectional view taken along lines 13—13 of FIG. 12.
Figure 14:
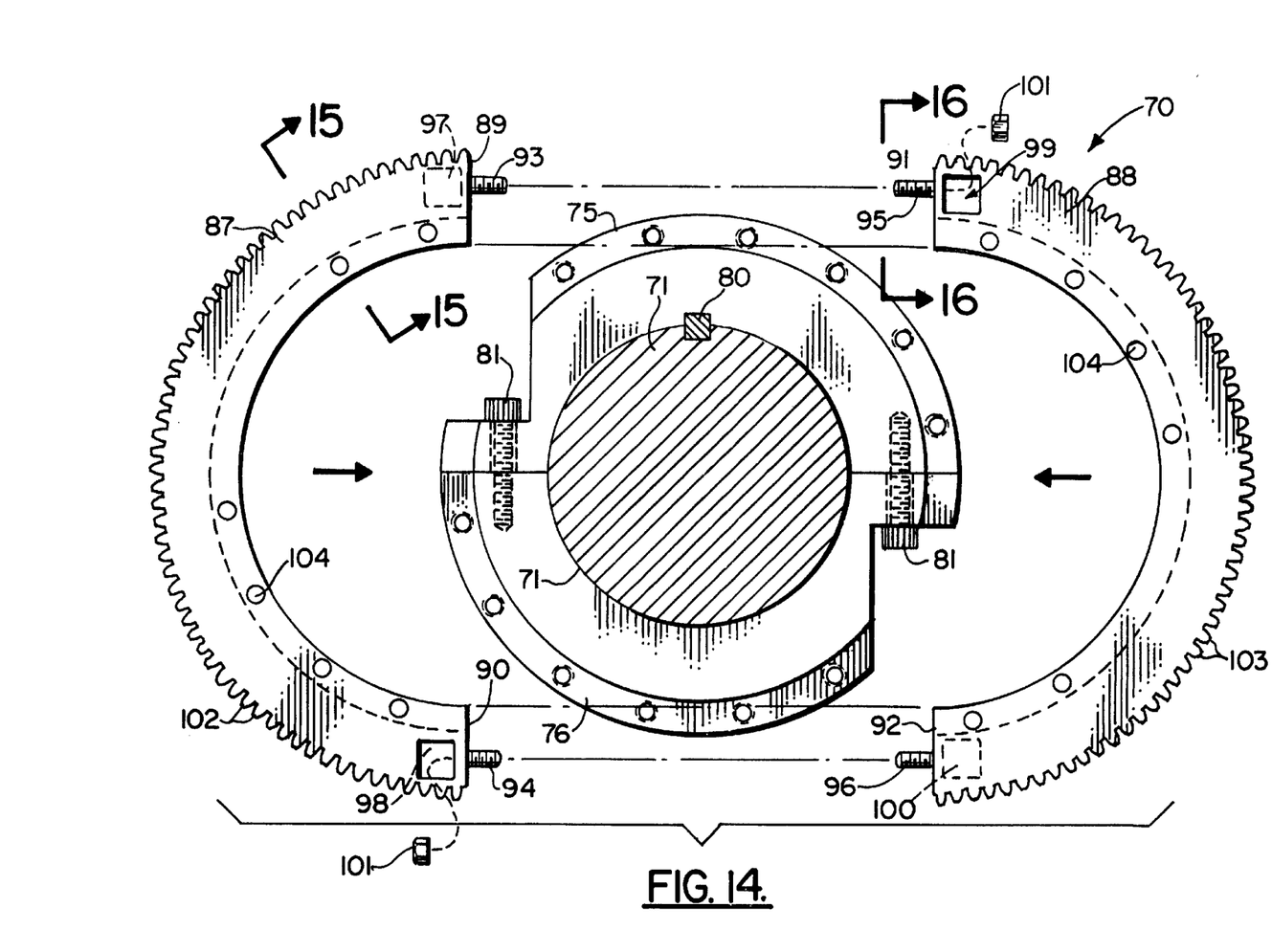
FIG. 14 is an exploded end view of the alternate embodiment of the apparatus of the present invention.
Figure 15:
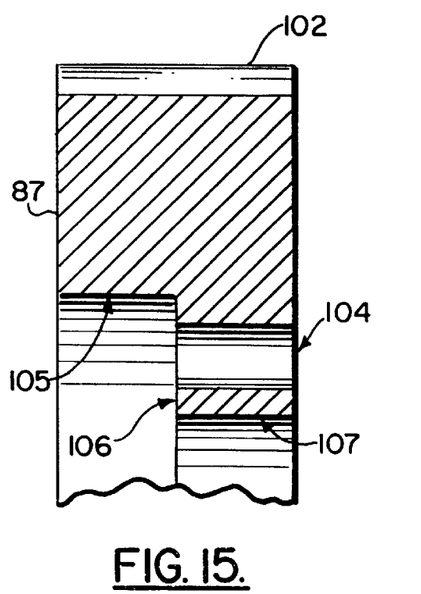
FIG. 15 is a sectional view taken along lines 15—15 of FIG. 14.
Figure 16:
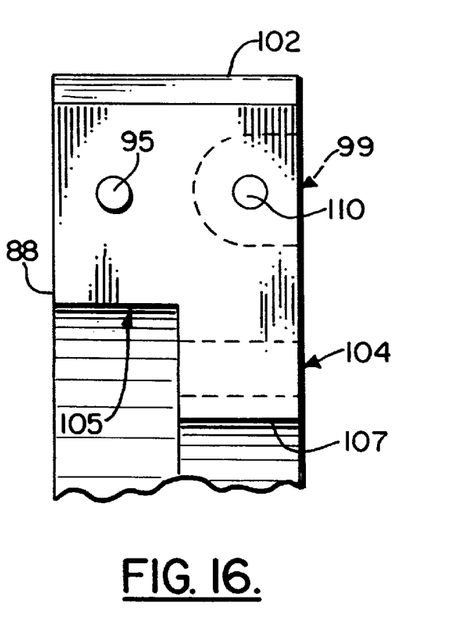
FIG. 16 is a sectional view taken along lines 16—16 of FIG. 14.
Figure 17:
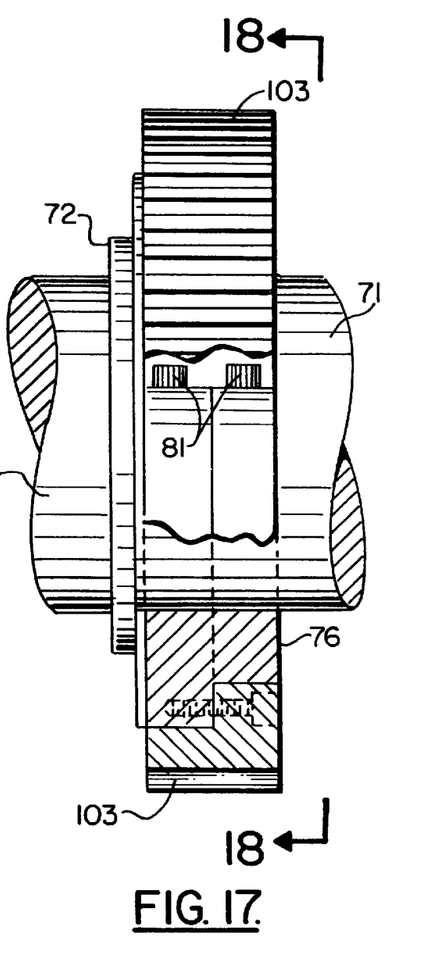
FIG. 17 is a side partially cut away elevational view of the alternate embodiment of the apparatus of the present invention.
Figure 18:
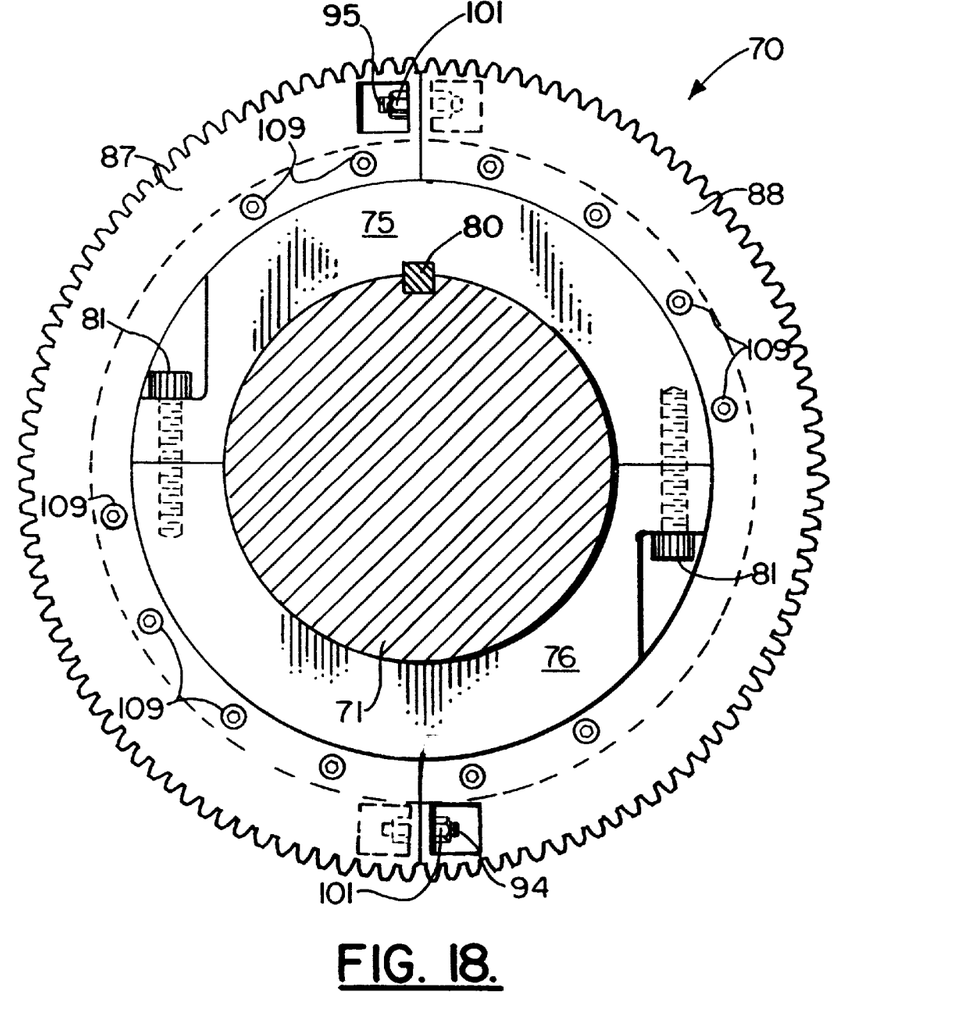
FIG. 18 is a view taken along lines 18—18 of FIG. 17.

FIGS. 10–18 show an alternate embodiment of the apparatus of the present invention designated generally by the numeral 70 in FIGS. 12, 14 and 18. Crankshaft repair apparatus 70 includes a crankshaft 71 having an annular member 72 thereon and flywheel 73. A keyway slot 74 receives keyway 80 for attaching a pair of rib members 75–76 to crankshaft 71.

The rib member 75 provides a generally semicircular surface 77 that fits against crankshaft 71. Likewise, the rib member 76 has a semicircular surface 78 that fits against crankshaft 71. Recess 79 on rib member 75 at semicircular surface 77 fits over keyway 80 after it has been installed in slot 74 as shown in FIGS. 10, 11, 13 and 18. Bolts 81 are used to fasten the rib member 75, 76 to crankshaft 71. Threaded openings 82, 83 are provided respectively on rib members 75, 76 for receiving an end portion of a bolt 81 on assembly. The bolts 81 pass through openings 84, 85 as shown in FIGS. 11 and 13 when assembly the rib member 75, 76 to crankshaft 71.

The periphery of each of the rib members 75, 76 provides a plurality of internally threaded openings 86, each of which is generally parallel to a center of rotation of crankshaft body 71, designated by the numeral 108 in FIG. 13. After the rib member 75, 76 are assembled to crankshaft body 71, a pair of gear half sections 87, 88 are fastened to the assembly of crankshaft body 71 and the rib member 75, 76 as shown in FIGS. 14 and 18. The gear half sections 87, 88 each provide a pair of opposed mating faces so that when the two gear half sections 87, 88 are joined together, the mating faces engage one another in face to face contact. In FIG. 14, the gear half section 87 includes mating faces 89, 90. The gear half section 88 includes mating faces 91, 92. Each of the gear sections 87, 88 provides a plurality of threaded shank members that cooperate with nuts 101 to fasten to gear half sections 87, 88 together at the mating faces 89, 92. In FIG. 14, threaded shanks 93, 94 are provided on gear half section 87. Threaded shanks 95, 96 are provided on gear half section 88. A plurality of sockets on the gear half sections enables nuts 101 to be fastened to each of the threaded shanks 93–96 as shown in FIGS. 14 and 18. The gear half section 87 includes sockets 97 and 98. The gear half section 88 has sockets 99, 100.

Each of the gear half sections 87, 88 provides a plurality of outwardly extending gear teeth. In FIGS. 14 and 18, gear half section 87 provides teeth 102. Gear half section 88 provides teeth 103.

Each of the gear half sections provides a plurality of radially spaced apart openings 104 through which bolts can pass before they engage the internally threaded openings 86 of the rib member 75, 76. Bolts are then used to fasten each of the gear half sections 87, 88 to the internally threaded openings 86 of the rib members 75, 76 as shown in FIG. 18 wherein the bolts are indicated by the numeral 109. In the sectional views of FIG. 15 and 16, annular surfaces 105, 107 are shown that engage correspondingly shaped annular surfaces of the rib member 75, 76. The flat annular surfaces 106 of each gear section engage corresponding surfaces of the rib members 75, 76.

An opening 110 is provided next to each of the sockets 97–100 through which a thread shank 93–96 can pass upon assembly of the gear half sections 87, 88.

The following table lists the parts numbers and parts descriptions as used herein and in the drawings attached hereto.

PARTS LIST

| Part Number | Description |
| --- | --- |
| 10 | repair apparatus |
| 11 | crankshaft |
| 12 | gear |
| 13 | opening |
| 14 | gear half |
| 15 | gear half |
| 16 | annular face |
| 17 | annular face |
| 18 | annular face |
| 19 | cylindrical surface |
| 20 | annular shoulder |
| 21 | gear tooth |
| 22 | flat mating surface |
| 23 | flat mating surface |
| 24 | flat mating surface |
| 25 | flat mating surface |
| 26 | opening |
| 27 | smaller diameter section |
| 28 | larger diameter section |
| 29 | bolt |
| 30 | bolt shank |
| 31 | bolt head |
| 32 | opening |
| 33 | opening |
| 34 | threaded stud |
| 35 | nut |
| 36 | keyway |
| 37 | annular hub |
| 38 | cylindrical surface |
| 39 | transverse annular surface |
| 40 | annular surface |
| 41 | flat surface |
| 42 | curved surface |
| 43 | flywheel |
| 44 | internally threaded opening |
| 45 | edge |
| 46 | curved annular surface |
| 47 | flat annular surface |
| 48 | keyway slot |
| 49 | socket |
| 50 | axis of rotation |
| 51 | |
| 70 | repair apparatus |
| 71 | crankshaft body |
| 72 | annular member |
| 73 | flywheel |
| 74 | keyway slot |
| 75 | rib member |
| 76 | rib member |
| 77 | semicircular surface |
| 78 | semicircular surface |
| 79 | recess |
| 80 | keyway |
| 81 | bolt |
| 82 | threaded opening |
| 83 | threaded opening |
| 84 | opening |
| 85 | opening |
| 86 | threaded opening |
| 87 | gear half section |
| 88 | gear half section |
| 89 | mating face |
| 90 | mating face |
| 91 | mating face |
| 92 | mating face |
| 93 | threaded shank |
| 94 | threaded shank |
| 95 | threaded shank |
| 96 | threaded shank |
| 97 | socket |
| 98 | socket |
| 99 | socket |
| 100 | socket |
| 101 | nut |
| 102 | gear tooth |
| 103 | gear tooth |
| 104 | opening |
| 105 | annular surface |
| 106 | surface |
| 107 | annular surface |
| 108 | center of rotation |
| 109 | bolt |
| 110 | opening |

The the foregoing embodiments are presented by way of example only; the scope of the present invention is to be limited only by the following claims.

What is claimed is:

1. A crankshaft apparatus, comprising:
a) a crankshaft body that includes an elongated member of a first smaller diameter with an outer surface and first and second end portions, the body having a center of rotation during use, and an enlarged diameter annular rib of a second, larger diameter at one of said end portions;
b) a ring gear removably mounted at one of the end portions, the ring gear comprising a pair of gear half sections, each gear half section having a curved inner surface defining a recess that is shaped to conform to the outer surface of the elongated member of first smaller diameter of the crankshaft body, a pair of opposed mating faces, a generally semicircular toothed section, and an annular flange extending both longitudinally of the gear toothed section radially inwardly of said semicircular curved inner surface; and
c) a removable connection that secures each ring gear section to the crankshaft body, said removable connection including a plurality of openings in the crankshaft that are spaced radially away from the crankshaft surface, the plurality of openings extending circumferentially about the crankshaft center of rotation, and a plurality of fasteners that attach each gear section to the crankshaft at the openings.

2. The crankshaft apparatus of claim 1 wherein the removable connection includes fasteners that fasten the gear sections together at a position next to the mating faces.

3. The crankshaft apparatus of claim 1 wherein the removable connection includes fasteners that bolt the gear sections to the crankshaft body at the openings, said fasteners including bolts that have shanks generally parallel to the crankshaft center of rotation.

4. The crankshaft apparatus of claim 1 wherein the crankshaft body has a transversely extending face, said transversely extending face carrying said plurality of openings.

5. The crankshaft apparatus of claim 1 wherein said annular flange includes a cylindrically shaped inner surface that is generally parallel to said outer semicircular tooth section and a flat surface that is generally perpendicular to the axis of rotation of the crankshaft.

6. The apparatus of claim 1 further comprising sockets positioned next to and spaced from said mating faces for enabling tools to access said fasteners.

7. The apparatus of claim 1 further comprising a flat transverse face on each of said gear sections next to said semicircular toothed section thereof, each of said transverse flat surfaces carrying sockets for receiving said fasteners.

8. The apparatus of claim 1 wherein there are two transverse surfaces on opposing sides of each of said gear half sections, each transverse surface being generally perpendicular to the center of rotation of the crankshaft.

9. The apparatus of claim 1 wherein the inner surface of each gear section is generally smooth, the inner surfaces of the gear sections forming a cylindrical surface upon assembly.

10. The apparatus of claim 1 wherein each gear section has first and second opposed surfaces, and connectors form a connection between the gear sections at both of the opposed surfaces.

11. A crankshaft apparatus, comprising:
a) a crankshaft body that includes an elongated member of a first smaller diameter with first and second end portions, a raised annular rib defining an enlarged diameter portion of the body, and the body having a center of rotation during use;
b) a ring gear removably mounted at one of the end portions upon the annular rib, the ring gear comprising a pair of gear sections, each gear section having a generally semicircular recess that is shaped to conform to the outer surface of the crankshaft body, a pair of opposed mating faces that abut and engage, and a generally semicircular toothed section; and
c) a removable connection that secures each ring gear section to the crankshaft body, said removable connection including a plurality of longitudinally extending drilled and tapped openings in the crankshaft at the raised annular rib, the plurality of openings extending circumferentially about the crankshaft center of rotation, spaced radially away from the smaller diameter elongated member, and a plurality of fasteners that attach each gear section to the crankshaft at the openings in the annular rib.

12. A crankshaft apparatus, comprising:
a) a crankshaft body that includes an elongated member with first and second end portions, the body having a center of rotation during use;
b) an enlarged diameter annular member comprised of multiple, separable sections and mounted to one of said end portions;
c) a ring gear removably mounted to the crankshaft next to the enlarged diameter member, the ring gear comprising a pair of gear half sections, each gear half section having a curved inner surface defining a recess that is shaped to conform to the outer surface of the crankshaft body, a pair of opposed mating faces, a generally semicircular toothed section, and an annular flange extending both longitudinally of the gear toothed section radially inwardly of said semicircular curved inner surface; and
d) a removable connection that secures each ring gear section to the crankshaft body and to the enlarged diameter annular member, said removable connection including a plurality of openings in the annular member, the plurality of openings extending circumferentially about the crankshaft center of rotation, and a plurality of fasteners that attach each gear section to the annular member at the openings.

13. The crankshaft apparatus of claim 12 wherein the removable connection includes fasteners that fasten the gear sections together at a position next to the mating faces.

14. The crankshaft apparatus of claim 12 wherein the removable connection includes fasteners that bolt the gear sections to the annular member at the openings, said fasteners including bolts that have shanks generally parallel to the crankshaft center or rotation.

15. The crankshaft apparatus of claim 12 wherein the annular member has a transversely extending face, said transversely extending face carrying said plurality of openings.

16. The crankshaft apparatus of claim 12 wherein said annular flange includes a cylindrically shaped inner surface that is generally parallel to said outer semicircular tooth section and a flat surface that is generally perpendicular to the axis of rotation of the crankshaft.

17. The apparatus of claim 12 further comprising sockets positioned next to end spaced from said mating faces for enabling tools to access said fasteners.

18. The apparatus of claim 12 further comprising a flat transverse face on each of said gear sections next to said semicircular toothed section thereof, each of said transverse flat surfaces carrying sockets for receiving said fasteners.

19. The apparatus of claim 12 wherein there are two transverse surfaces on opposing sides of each of said gear half sections, each transverse surface being generally perpendicular to the center of rotation of the crankshaft.

20. The apparatus of claim 12 wherein the inner surface of each gear section is generally smooth, the inner surfaces of the gear sections forming a cylindrical surface upon assembly.

21. The apparatus of claim 12 wherein each gear section has first and second opposed surfaces, and connectors form a connection between the gear sections at both of the opposed surfaces.

22. A method of repairing a crankshaft body having first and second end portions, a center of rotation, and a ring gear at one end portion thereof mounted on an enlarged diameter annular member, comprising the steps of:
   a) removing the worn ring gear from the crankshaft end portion;
   b) providing a replacement ring gear that comprises a pair of gear half sections, each gear half section having an annular flange shaped inner surface that conforms generally to the outer surface of the crankshaft next to the enlarged diameter annular member, a pair of opposed mating surfaces, and a transversely extending annular surface that extends radially along a plane the intersects the center of rotation of the crankshaft;
   c) drilling and tapping a plurality of openings in the crankshaft, the plurality of openings extending circumferentially about the crankshaft center of rotation;
   d) fastening each gear half section to the crankshaft with fasteners that attach the gear half section to the crankshaft at the openings; and
   e) fastening each gear half section to the other gear section at the mating faces.

23. The method of claim 22 wherein step "c" comprises forming a plurality of internally threaded openings in the crankshaft, the plurality of internally threaded openings extending circumferentially about the crankshaft center of rotation.

24. The method of claim 22 wherein step "d" comprises fastening each gear half section to the crankshaft with fasteners that attach the gear half section to the crankshaft at the openings, the fasteners and openings both being generally parallel to the center of rotation of the crankshaft.

25. The method of claim 22 wherein step "d" comprises fastening each gear half section to the crankshaft so that the mating faces of one gear half section engage and contact the mating surfaces of the other gear half section and wherein the gear half sections are attached to the crankshaft with fasteners that attach the gear section to the crankshaft at the openings.

26. The method of claim 22 further comprising the step of preventing rotation of the replacement ring gear with respect to the crankshaft body.

27. The method of claim 26 wherein the relative rotation is prevented by placing a key way in between the crankshaft body and one of the gear half sections.

28. The method of claim 22 wherein in step "c" each of the plurality of openings is oriented longitudinally and a plurality of said openings are generally parallel.

29. The method of claim 1 further comprising the step of fastening each gear half section to the crankshaft with bolts that threadably engage the openings in the crankshaft and wherein the bolts are generally parallel to the center of rotation of the crankshaft.

30. The method of claim 22 wherein the mating faces are spaced apart a measure of about 180 degrees.

31. A method of repairing a crankshaft body having first and second end portions, a center of rotation, and a ring gear at one end portion thereof, comprising the steps of:
   a) attaching an enlarged diameter annular member to the crankshaft body at a selected location, the enlarged annular member including a plurality of sections that are connected together, each section having a curved surface that closely conforms to the crankshaft body;
   b) removing the worn ring gear from the crankshaft end portion;
   c) providing a replacement ring gear that comprises a pair of gear half sections, each gear half section having an annular flange shaped inner surface that conforms generally to the outer surface of the crankshaft next to the enlarged diameter annular member, a pair of opposed mating surfaces, and a transversely extending annular surface that extends radially along a plane the intersects the center of rotation of the crankshaft;
   d) drilling and tapping a plurality of openings in the enlarged annular member the plurality of openings extending circumferentially about the enlarged annular member center of rotation;
   e) fastening each gear half section to the enlarged annular member with fasteners that attach the gear half section to the enlarged annular member at the openings; and
   f) fastening each gear half section to the other gear section at the mating faces.

32. The method of claim 31 wherein step "d" comprises forming a plurality of internally threaded openings in the enlarged annular member, the plurality of internally threaded openings extending circumferentially about the crankshaft center of rotation.

33. The method of claim 31 wherein step "e" comprises fastening each gear half section to the enlarged diameter annular member with fasteners that attach the gear half section to the enlarged diameter annular member at the openings, the fasteners and openings both being generally parallel to the center of rotation of the crankshaft.

34. The method of claim 31 wherein step "e" comprises fastening each gear half section to the enlarged diameter annular member so that the mating faces of one gear half section engage and contact the mating surfaces of the other gear half section and wherein the gear half sections are attached to the enlarged diameter annular member with fasteners that attach the gear section to the enlarged diameter annular member at the openings.

35. The method of claim 31 further comprising the step of preventing relative rotation of the replacement ring gear with respect to the crankshaft body.

36. The method of claim 35 wherein the relative rotation is prevented by placing a key way in between the crankshaft body and one of the gear half sections.

37. The method of claim 31 wherein in step "c" each of the plurality of openings is oriented longitudinally and a plurality of said openings are generally parallel.

38. The method of claim 31 further comprising the step of fastening each gear half section to the enlarged diameter annular member with bolts that threadably engage the openings in the enlarged diameter annular member and wherein the bolts are generally parallel to the center of rotation of the enlarged diameter annular member.

39. The method of claim 31 wherein the mating faces are spaced apart a measure of about 180 degrees.

* * * * *